(12) United States Patent
Kobayashi

(10) Patent No.: US 6,418,302 B1
(45) Date of Patent: Jul. 9, 2002

(54) WIRELESS DEVICE

(75) Inventor: Fumihiko Kobayashi, Ootawara (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/526,390

(22) Filed: Mar. 16, 2000

(30) Foreign Application Priority Data

Mar. 17, 1999 (JP) .......................................... 11-072382

(51) Int. Cl.⁷ ............................................... H04B 1/02
(52) U.S. Cl. ......................... 455/103; 45/102; 45/127; 45/22
(58) Field of Search ............................ 455/15, 16, 11.1, 455/18, 20, 21, 22, 103, 127, 102, 59, 17; 370/330, 344, 319

(56) References Cited

U.S. PATENT DOCUMENTS

| 4,412,325 A | * 10/1983 | Molo | 370/210 |
| 5,584,058 A | * 12/1996 | Arnold | 455/103 |
| 5,838,732 A | * 11/1998 | Carney | 375/297 |
| 6,181,450 B1 | * 1/2001 | Dishman | 359/124 |

FOREIGN PATENT DOCUMENTS

| JP | 8-008807 | 1/1996 |
| JP | 8-56184 | 2/1996 |
| JP | 9-261082 | 10/1997 |

* cited by examiner

Primary Examiner—Vivian Chin
Assistant Examiner—John J Lee
(74) Attorney, Agent, or Firm—Katten Muchin Zavis Rosenman

(57) ABSTRACT

A wireless device that performs transmission of multiple wireless channels arranged within the used wireless frequency band at prescribed frequency intervals. Multiple wireless channels are divided into two systems, odd-numbered and even-numbered with gaps of one, or into two or more systems with gaps of two or more. Included are transmission amplifiers that transmit in common for each system, multiple band elimination filters connected in cascades to reduce the adjacent-channel leakage power in each system, and circulators that compose the transmission signals of each system. Transmission is done from an antenna via a transmission-reception signal splitter.

8 Claims, 9 Drawing Sheets

WIRELESS DEVICE

FIELD OF THE INVENTION

This invention concerns a wireless device that performs transmission of multiple wireless channels arranged within the used frequency band at prescribed frequency intervals.

In a wireless communication system, sometimes a single frequency is used, and sometimes multiple frequencies are used, and in a mobile communication system, in order to make efficient use of the used frequency band, multiple wireless channels are arranged at fixed frequency intervals and wireless devices are used that allow transmission and reception of multiple wireless channels. This invention concerns a wireless device that makes it possible to transmit such multiple wireless channels efficiently.

BACKGROUND OF THE INVENTION

In a wireless communication system such as a mobile communication system, a high-frequency band of several GHz or more is used to make high-speed wireless transmission possible and increase the number of terminals that can be accommodated within the wireless frequency-band. In order to make efficient use of the wireless frequency band, the frequency spacing is made as narrow as possible, and a composition is used in which the wireless channels are arranged continuously.

The transmission amplifier for amplifying the transmitted signal performs high-efficiency amplification by carrying out the amplification operation near the saturated output. But because of the nonlinearity near the saturated output, the amplified output signal contains a distortion component, which leaks into neighboring channels. Thus, various distortion-compensating amplifiers have been proposed that suppress this distortion component.

FIG. 5 is a diagram for explaining a distortion-compensating amplifier; 51 is a distributor, 52 is a vector adjuster, 53 is a main amplifier, 54 is a delay line, 55 is directional coupler, 56 is a delay line, 57 is a composer, 58 is a vector adjuster, and 59 is an auxiliary amplifier.

The input signal is divided into two by distributor 51; one part is input via vector adjuster 52 to main amplifier 53, whose amplified output signal is input to directional coupler 55, and the other part of the input signal that is divided into two by distributor 51 is input via delay line 54 to directional coupler 55. Delay line 54 is for correcting the delay time between vector adjuster 52 and main amplifier 53.

Accordingly, the amplified output signal from main amplifier 53 and the delayed input signal that goes through delay line 54 go through directional coupler 55 and are combined and output in a prescribed ratio to delay line 56 and vector adjuster 58. The distortion component due to main amplifier 53 consists of the difference between the amplified output signal and the input signal, so this difference is amplified by auxiliary amplifier 59 and is composed and output by composer 57 so as to cancel the distortion component of the amplified output signal of main amplifier 53. In this way it is possible to amplify the input signal while operating main amplifier 53 near its saturation output and to produce an output signal in which the distortion component of the amplified output signal is corrected.

A common amplification system, in which the transmission signals of multiple wireless channels are amplified in common, and an individual amplification system, in which the transmission signal is amplified in correspondence with a wireless channel, are well known. FIG. 6 is a diagram for explaining the common amplification system of a conventional example. In this diagram, 61-1 through 61-n are modulators that correspond to wireless channels, 62 is a composer, 63 is a transmission amplifier, 64 is a transmission-reception signal splitter, 65 is an antenna, and 66 is a receiver.

The modulated output signals of modulators 61-1 through 61-n corresponding to the wireless channels are composed by composer 62 and input to transmission amplifier 63. This transmission amplifier 63 employs, for example, a composition of the aforesaid distortion-compensating amplifiers, amplifies the output signals of the wireless channels in common, and transmits it from antenna 65 via transmission-reception signal splitter 64.

FIG. 7 is a diagram for explaining the individual amplification system of a conventional example; 71-1 through 71-n are modulators that correspond to wireless channels, 72-1 through 72-n are transmission amplifiers corresponding to the wireless channels, 73-1 through 73-n and 74-1 through 74-n are band elimination filters, 75 is a composer, 76 is a transmission-reception signal splitter, 77 is an antenna, and 78 is a receiver.

The transmitted signals corresponding to the wireless channels are modulated by modulators 71-1 through 71-n and are each amplified by its corresponding transmission amplifier 72-1 through 72-n. In this case, the adjacent channel leakage power is eliminated by band elimination filters 73-1 through 73-n and 74-1 through 74-n, they are composed by composer 75, and the composed signal is transmitted from antenna 77 via transmission-reception signal splitter 76.

FIG. 8 is an explanatory diagram of the arrangement of wireless channels; for example, it shows the spectra of wireless channels CH1 through CH4, each of which includes relatively large leakage power into the adjacent channels. Thus a filter having steep attenuation characteristics is proposed. For example, by connecting band elimination filters 91 and 92 having the frequency response shown in FIG. 9, it is possible to have as the transmission signal only the band that is exclusively occupied by a given wireless channel.

As filters for eliminating unwanted waves, superconducting filters are known. For example, by composing a band-pass filter by connecting resonators that are cooled to a superconducting state in multiple cascades, and reducing the resistance to zero, the pass loss of the pass band can be set to zero. In this case, it is known that one can compose a band-pass filter whose unloaded Q is 200,000 and obtain a frequency response of 2 GHz +/−5 MHz (for example, see unexamined patent H9-261082 [1997]).

The individual amplification system of the conventional example requires transmission amplifiers 72-1 through 72-n corresponding to the wireless channels, and presents the problem that its wireless device is of a large size. And for each transmission amplifier 72-1 through 72-n, two band elimination filters having characteristics as shown in FIG. 9 are required.

In the common amplification system of the conventional example, the transmission signals corresponding to the wireless channels are amplified in common, and its spectrum is as shown in, for example, FIG. 8. Therefore leakage power into the adjacent channels occurs, and it is nearly impossible to allow only the transmission signal of each wireless channel to pass through with a band-pass filter by a superconducting filter having the aforesaid steep frequency response. That is, it is difficult to narrow the frequency spacing between wireless channels, and with the common amplification system it is no longer possible to make effective use of the wireless frequency band.

Therefore if the wireless channel frequency spacing is broad, it is possible to apply the common amplification system, but if the frequency spacing is made narrow, it is difficult to apply the common amplification system. From such considerations, if the individual amplification system is applied, as mentioned above, this requires transmission amplifiers 72-1 through 72-n and band elimination filters 73-1 through 73-n and 74-1 through 74-n corresponding to the wireless channels, which increases the size and power consumption of the device.

The purpose of this invention is to make it possible to have a smaller-size device with lower power consumption.

SUMMARY OF THE INVENTION

The wireless device of this invention performs transmission of multiple wireless channels arranged within the used frequency band at prescribed frequency intervals. A transmission amplifier puts together, in multiple systems, multiple wireless channels with spacing of at least one frequency between them and performs common amplification of the transmission signal of each system. Band elimination filters in cascade connection so as to input the amplified output signal of the transmission amplifier and reduce the adjacent channel leakage power, and a composition means for composing and transmitting the transmission signals output via said band elimination filters.

Additionally, in a wireless device that performs transmission of multiple wireless channels arranged within the used frequency band at prescribed frequency intervals, continuous numbers are assigned to the multiple wireless channels arranged within the used wireless frequency band. The numbered channels are divided into two systems of odd-number wireless channel numbers and even-number wireless channel numbers and coupled to an odd-number wireless channel number transmission unit 1 and an even-number wireless channel number transmission unit 2. A composition means 3 composes the output signals of the odd-number wireless channel number transmission unit 1 and even-number wireless channel number transmission unit 2.

Odd-number wireless channel number transmission unit 1 includes a transmission amplifier 13 that composes the transmission signals of the odd-number wireless channel numbers and performs common amplification. Multiple cascade-connected band elimination filters 14-1 through 14-(k+1) receive as an input the amplified output signal of the transmission amplifier 13 and eliminate the frequency components of the even-number wireless channel numbers of the adjacent channels. Even-number wireless channel number transmission unit 2 includes a transmission amplifier 23 that composes the transmission signals of the even-number wireless channel numbers and performs common amplification. Multiple cascade-connected band elimination filters 24-1 through 24-(j+1) receive as an input the amplified output signal of the transmission amplifier 23 and eliminate the frequency components of the odd-number wireless channel numbers of the adjacent channels.

The composition means includes multiple cascade-connected circulators, one end connected to an end terminal and the other end connected to an antenna and receiver. The composition means can have a composition whereby the transmission signals of the corresponding systems of the transmission amplifiers are respectively input to other multiple circulators except the circulator connected to said antenna and receiver.

DETAILED DESCRIPTION

Figure 1:
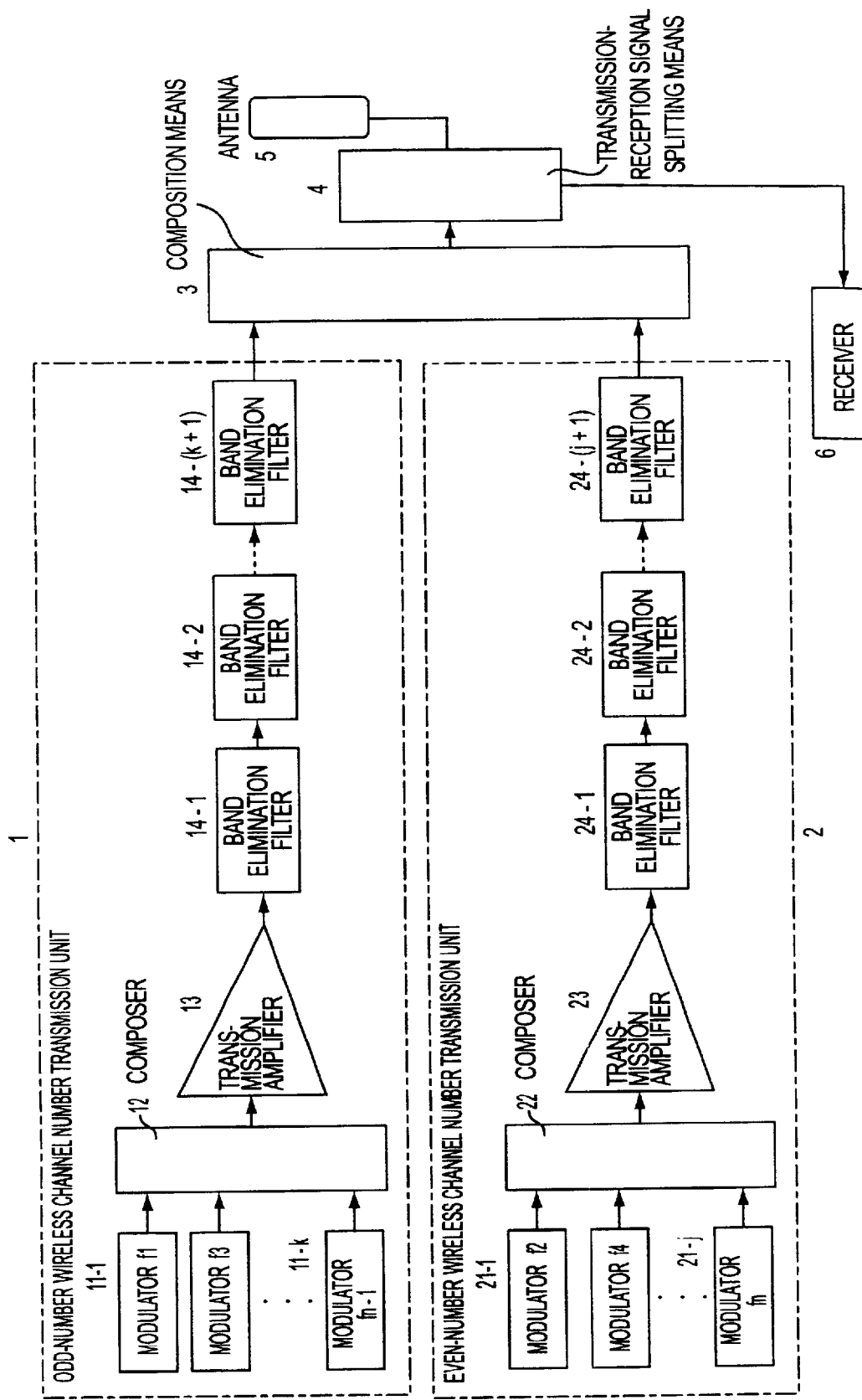
FIG. 1 is a block diagram of an exemplary embodiment of this invention.

FIG. 1 is a block diagram of an exemplary embodiment of this invention. Item 1 is an odd-number wireless channel number transmission unit, 2 is an even-number wireless channel number transmission unit, 3 is a composition means, 4 is a transmission-reception signal splitting means, 5 is an antenna, 6 is a receiver, 11-1 through 11-k and 21-1 through 21-j are modulators, 12 and 22 are composers, 13 and 23 are transmission amplifiers, 14-1 through 14-(k+1) and 24-1 through 24-(j+1) are band elimination filters each for a different frequency band. Various known compositions can be applied to receiver 6, which processes signals received from antenna 5 via transmission-reception signals splitting means 4.

Multiple wireless channels are arranged within the used wireless frequency band at prescribed frequency intervals, and continuous numbers are assigned to each. In this case, numbering the wireless channels as 1 through n, this embodiment shows the case in which they are divided into two system: the odd-number channel numbers and the even-number channel numbers. That is, odd-number wireless channel number transmission unit 1 modulates the transmission signals of the wireless channels having an odd number by means of modulators 11-1 through 11-k (where k=n/2), respectively. Even-number wireless channel number transmission unit 2 modulates the transmission signals of the wireless channels having an even number by means of modulators 21-1 through 21-j (where j=n/2), respectively.

Figure 2A:
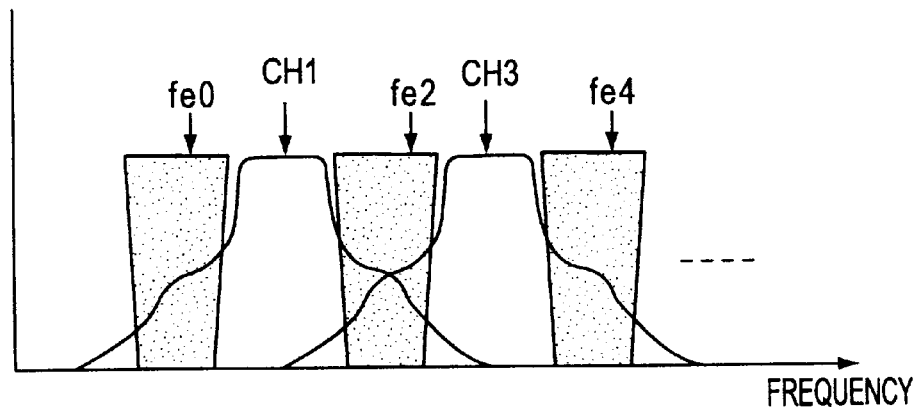
FIG. 2 is an explanatory diagram of the operation of the exemplary embodiment of this invention.
Figure 2B:
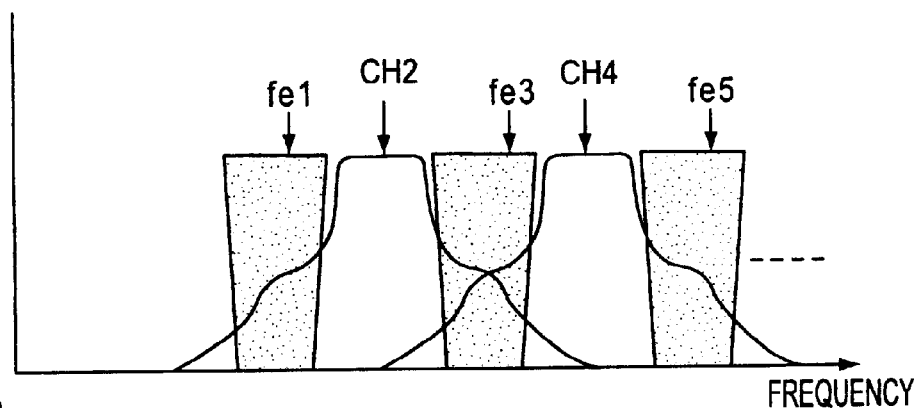

The modulated signals of the odd-number wireless channels and the modulated signals of the even-number wireless channels are composed by composers 12 and 22, respectively. The composers combine the modulated frequencies along a frequency domain. The combination of the frequencies is shown in FIGS. 2A and 2B with the x-axis being frequency. In (A) of this diagram, CH1 and CH3 indicate the transmission spectra of the odd-number wireless channel numbers and in (B) CH2 and CH4 indicate the transmission spectra of the even-number wireless channel numbers. These composed output signals are amplified in common by transmission amplifiers 13 and 23, respectively. The composition of the aforesaid distortion-correcting amplifier can be applied to these transmission amplifiers 13 and 23.

Denoting the frequencies of the wireless channels in odd-number wireless channel number transmission unit 1 by f1, f3, f5, . . . , f(n-1) and the frequencies of the wireless channels in even-number wireless channel number transmission unit 2 by f2, f4, f6. . . , fn (where n is an even number), band elimination filters 14-1 through 14-(k+1) of odd-number wireless channel number transmission unit 1 are composed so as to eliminate the common-amplified frequency in even-number wireless channel number transmission unit 2 and the frequencies outside the used wireless band f0, f2, f4, . . . , fn. Also, band elimination filters 24-1 through 24-(j+1) of even-number wireless channel number transmission unit 2 are composed so as to eliminate the common-amplified frequency in odd-number wireless channel number transmission unit 1 and the frequencies outside the used band f1, f3, f5, . . . , f(n+1).

That is, with band elimination filters 14-1 through 14-(k+1) of odd-number wireless channel number transmission unit 1, what corresponds to the leakage power of adjacent channels are the frequency components of the transmission signals amplified in common in even-number wireless channel number transmission unit 2, and they eliminate the components of the transmission signals of the even-number wireless channel numbers of frequencies f2, f4, f6, . . . , between the transmission signals of the odd-number wireless channel numbers of frequencies f1, f3, f5, . . . that are amplified in common. Moreover, band elimination filters that eliminate the signal components on the low-frequency side or high-frequency side outside the used wireless frequency band can be provided.

Similarly, band elimination filters 24-1 through 24-(j+1) of even-number wireless channel number transmission unit 2 eliminate the components of the transmission signals of the odd-number wireless channel numbers of frequencies f1, f3, f5, . . . , between the transmission signals of the even-number wireless channel numbers of frequencies f2, f4, f6,. . . that are amplified in common.

Figure 2C:
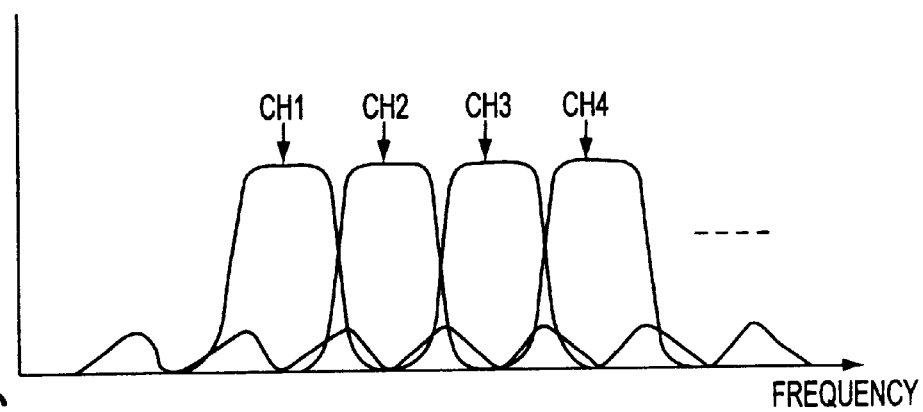

FIG. 2 is a diagram for explaining the operation of the exemplary embodiment of this invention. (A) Shows the transmission spectrum of part of odd-number wireless channel number transmission unit 1 and the frequency characteristics of the band elimination filters. (B) Shows the transmission spectrum of part of even-number wireless channel number transmission unit 2 and the frequency characteristics of the band elimination filters, and (C) shows part of the spectrum of the transmission signal of the odd-number wireless channel numbers and even-number wireless channel numbers, respectively.

In (A) of this diagram, CH1 and CH3 indicate the transmission spectra of the odd-number wireless channel numbers, and fe0, fe2, and fe4 indicate the band elimination characteristics of band elimination filters 14-1, 14-2, and 14-3. Band elimination filter 14-1 is for eliminating frequency f0, which lies outside the used wireless frequency band. In (B), CH2 and CH4 indicate the transmission spectra of the even-number wireless channel numbers, and fe1, fe3, and fe5 indicate the band elimination characteristics of band elimination filters 24-1, 24-2, and 24-3.

That is, band elimination filters 14-1 through 14-(k+1) of odd-number wireless channel number transmission unit 1 eliminate the signal components of the frequencies that are amplified in common by transmission amplifier 23 of even-number wireless channel number transmission unit 2 that correspond to adjacent channels, and band elimination filters 24-1 through 24-(j+1) of even-number wireless channel number transmission unit 2 eliminate the signal components of the frequencies that are amplified in common by transmission amplifier 13 of odd-number wireless channel number transmission unit 1 that correspond to adjacent channels.

Therefore if the amplified output signals of odd-number wireless channel number transmission unit 1 and even-number wireless channel number transmission unit 2 are composed by composition means 3, then as shown in (C) of FIG. 2, the transmission signals of wireless channel numbers CH1, CH2, CH3, CH4, . . . will be arranged with the leakage power of adjacent channels reduced.

Figure 7:
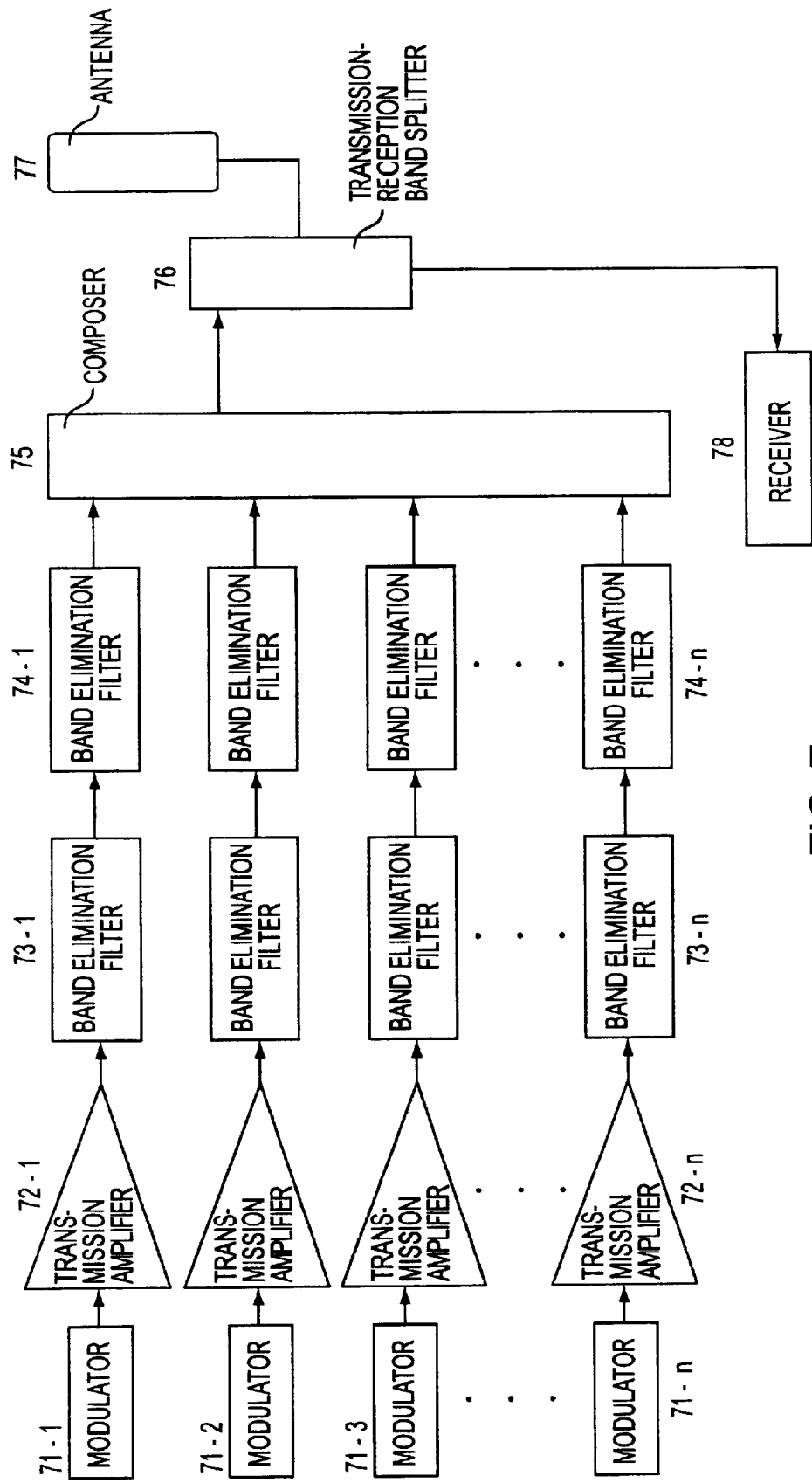
FIG. 7 is an explanatory block diagram of the individual amplification system of the conventional example.
Figure 8:
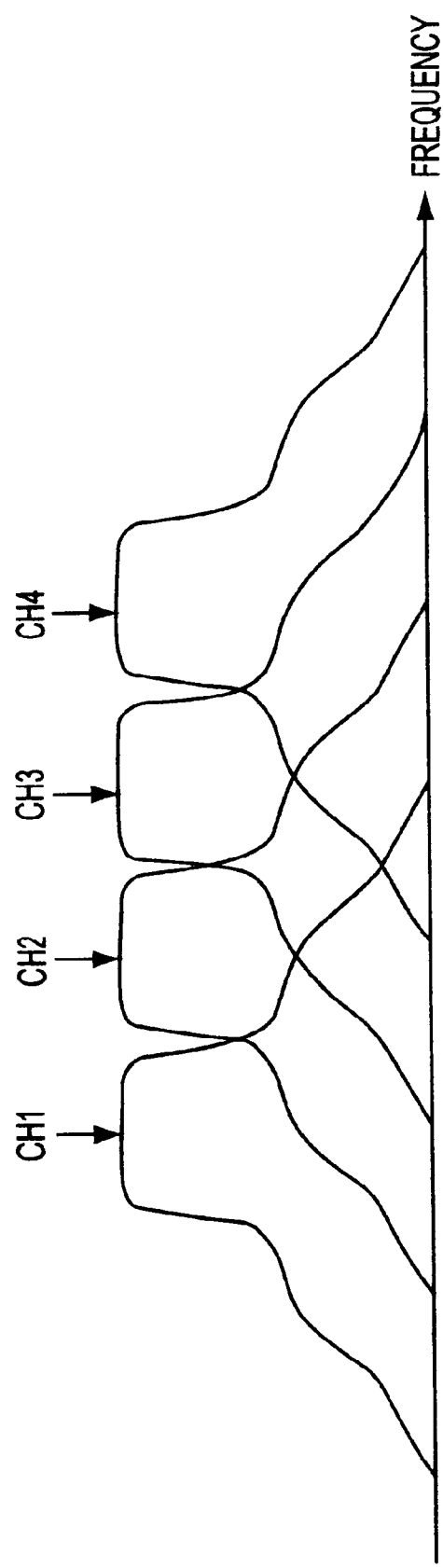
FIG. 8 is an explanatory diagram of the wireless channel arrangement.
Figure 9:
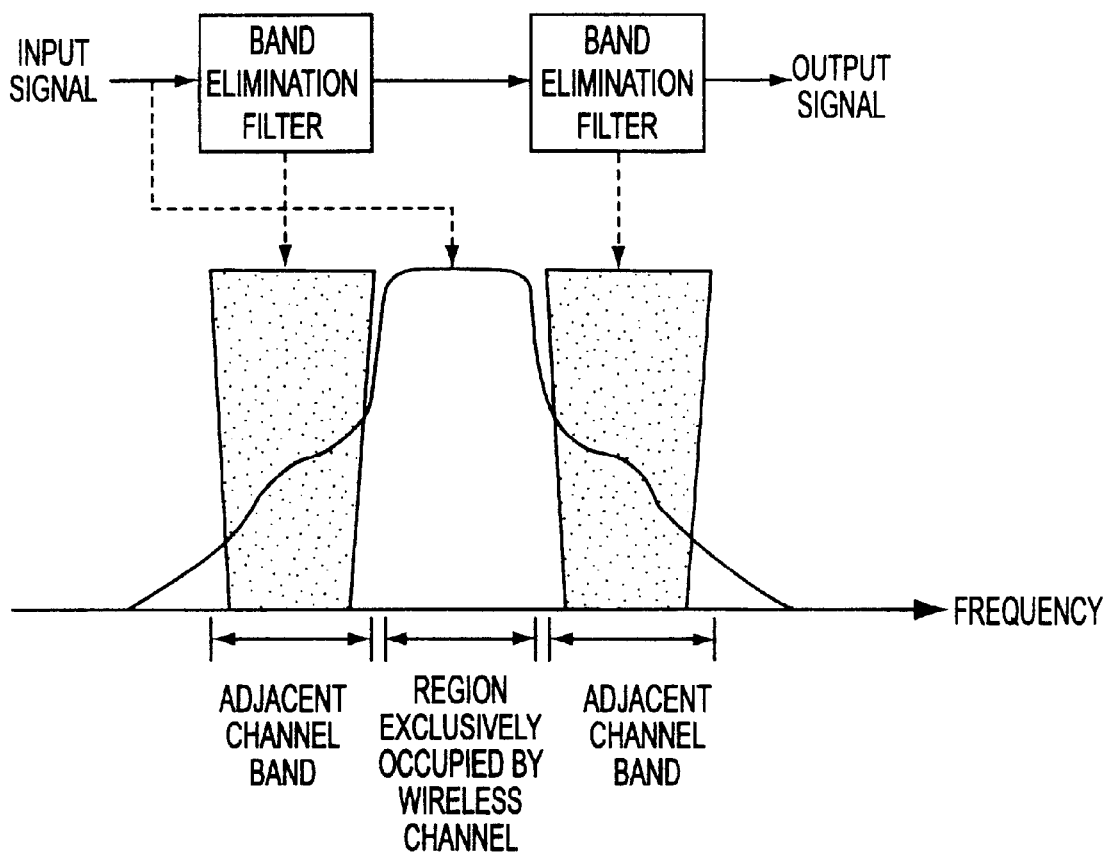
FIG. 9 is an explanatory diagram of the attenuation means for adjacent-channel leakage power.

For example, concerning the n wireless channels CH1 through CHn within the used wireless frequency band (where n is an even number), if we make a comparison with the individual amplification system shown in FIG. 7 of the conventional example, in the conventional example we need to have n transmission amplifiers and 2n band elimination filters. With the aforesaid embodiment of this invention, by contrast, there are two transmission amplifiers and n+4 band elimination filters, including those that eliminate the frequency components outside the used frequency band. Thus this invention makes it possible to reduce the number of transmission amplifiers to 2/n of the original and the number of band elimination filters to (n+4)/2n of the original. For example, if n=32, this invention reduces the number of transmission amplifiers to $\frac{1}{16}$ and the number of band elimination filters to $\frac{9}{16}$ the number needed in the conventional example.

Figure 6:
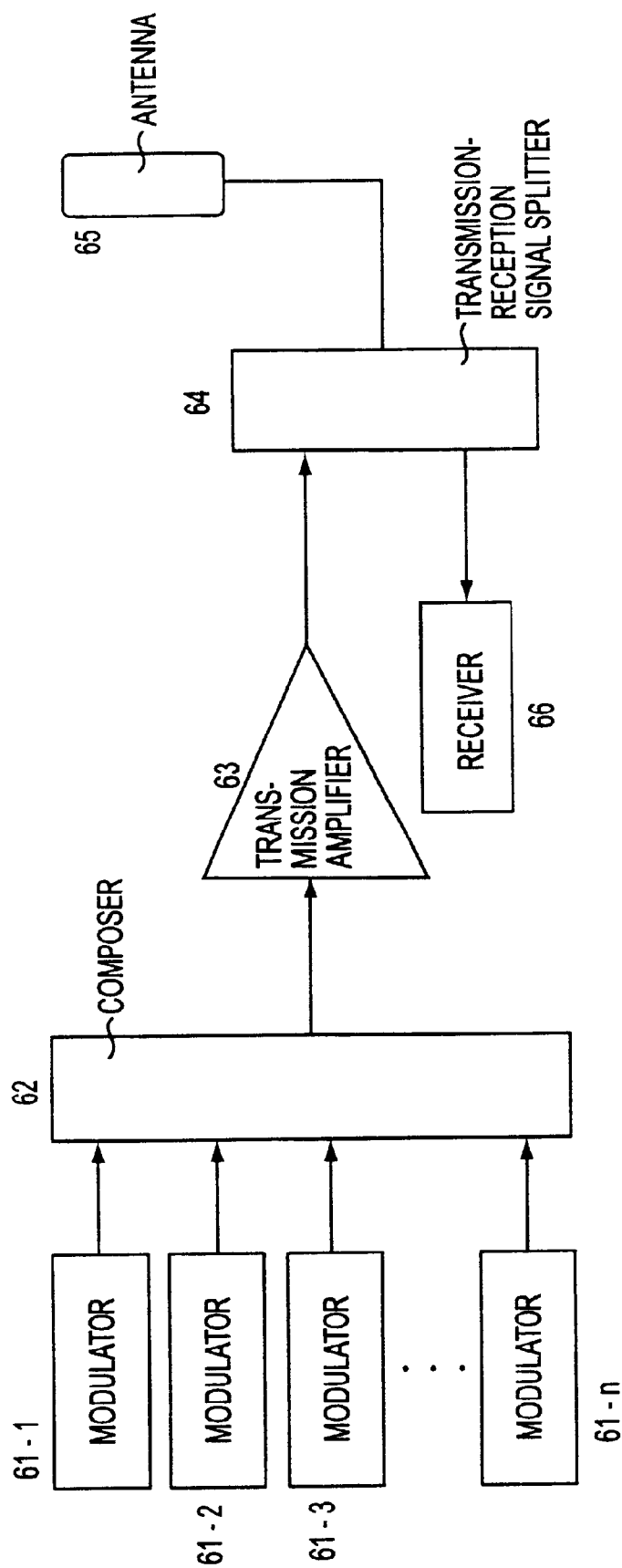
FIG. 6 is an explanatory block diagram of the common amplification system of the conventional example.

With the common amplification system shown in FIG. 6 of the conventional example, one transmission amplifier is utilized, but because of the leakage power of the adjacent channels, it is necessary to have a wide spacing between the frequencies of the wireless channels, which makes it impossible to efficiently utilize the wireless frequency band.

Figure 3:
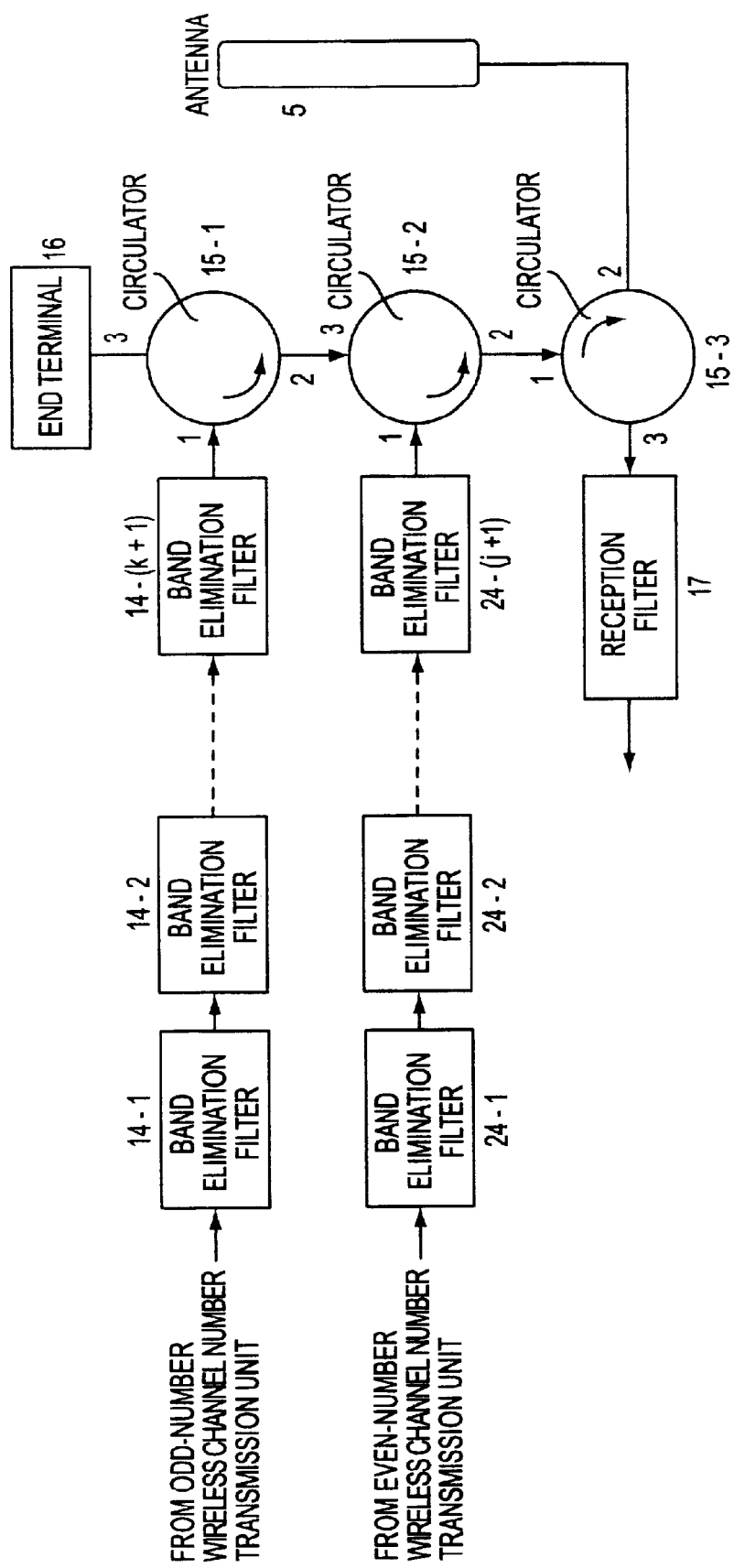
FIG. 3 is a block diagram of the main parts of another exemplary embodiment of this invention.

FIG. 3 is a block diagram of the main parts of another exemplary embodiment of this invention; the same symbols as in FIG. 1 indicate the same parts, and 15-1, 15-2, and 15-3 indicate circulators, 16 indicates an end terminal, and 17 indicates a reception filter. This embodiment illustrates the case in which composition means 3 in FIG. 1 consists of multiple cascade-connected circulators 15-1 through 15-3 and end terminal 16.

The output signal of odd-number wireless channel number transmission unit 1 via band elimination filters 14-1 through 14-(k+1) and the output signal of even-number wireless channel number transmission unit 2 via band elimination filters 24-1 through 24-(j+1) are composed via circulators 15-1 and 15-2 and are transmitted from antenna 5 via circulator 15-3.

With respect to the transmission signal from odd-number wireless channel number transmission unit 1 input to port 3 of circulator 15-2 via port 2 of circulator 15-1, to whose port 3 is connected to end terminal 16 for terminating the end of the circulators. Band elimination filters 24-1 through 24-(j+1), which are connected to port 1 of circulator 15-2, all have band-blocking characteristics. Therefore the output signal of odd-number wireless channel number transmission unit 1 is input, together with the output signal of even-number wireless channel number transmission unit 2, into port 1 of circulator 15-3 and is output from port 2 of circulator 15-3, and is transmitted from antenna 5. Transmission-reception signal splitting is performed from circulator 15-3, port 2. A receiver (not pictured) is connected via reception filter 17 to port 3 of circulator 15-3.

Figure 4:
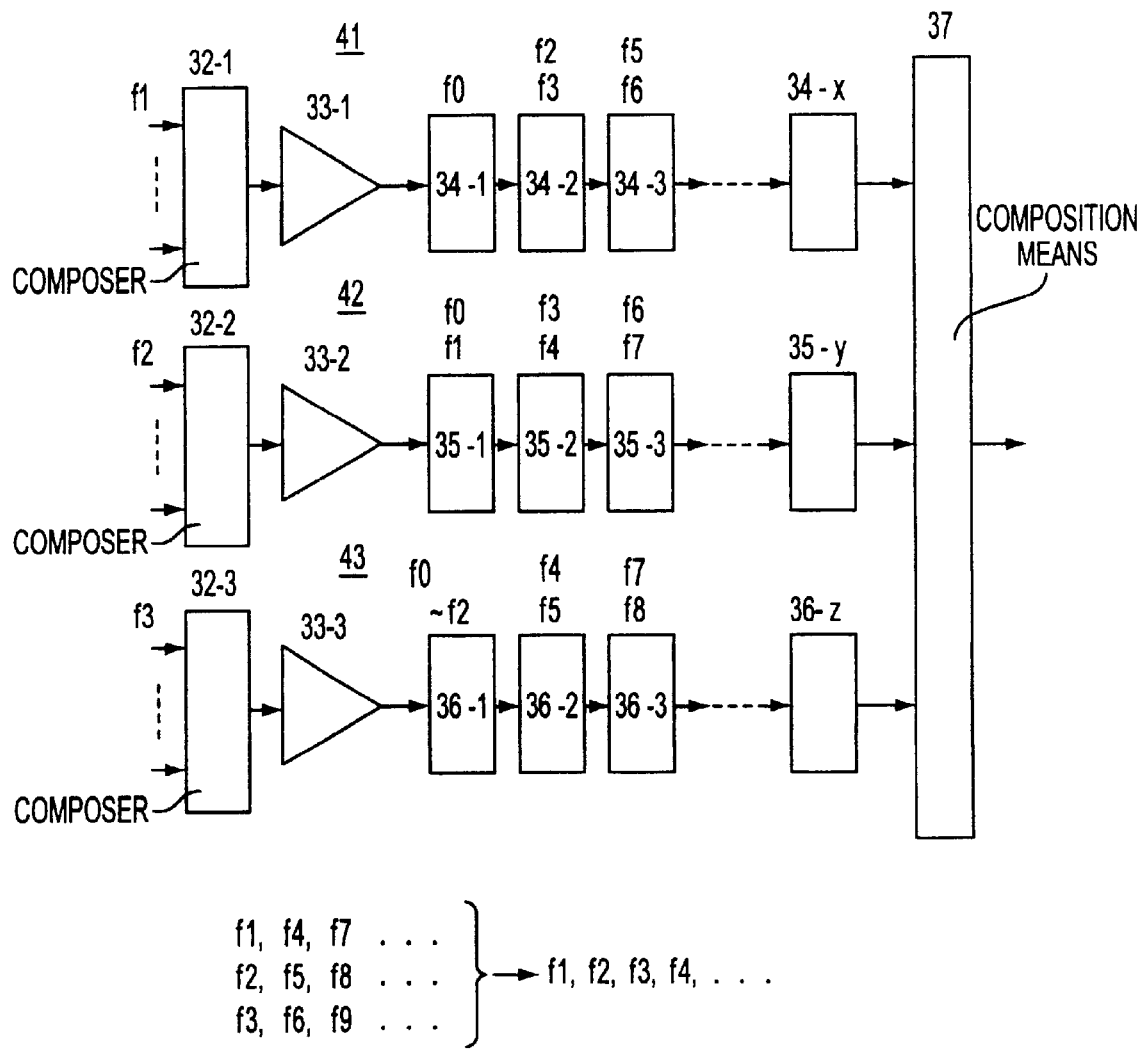
FIG. 4 is a block diagram of the main parts of a further exemplary embodiment of this invention.
Figure 5:
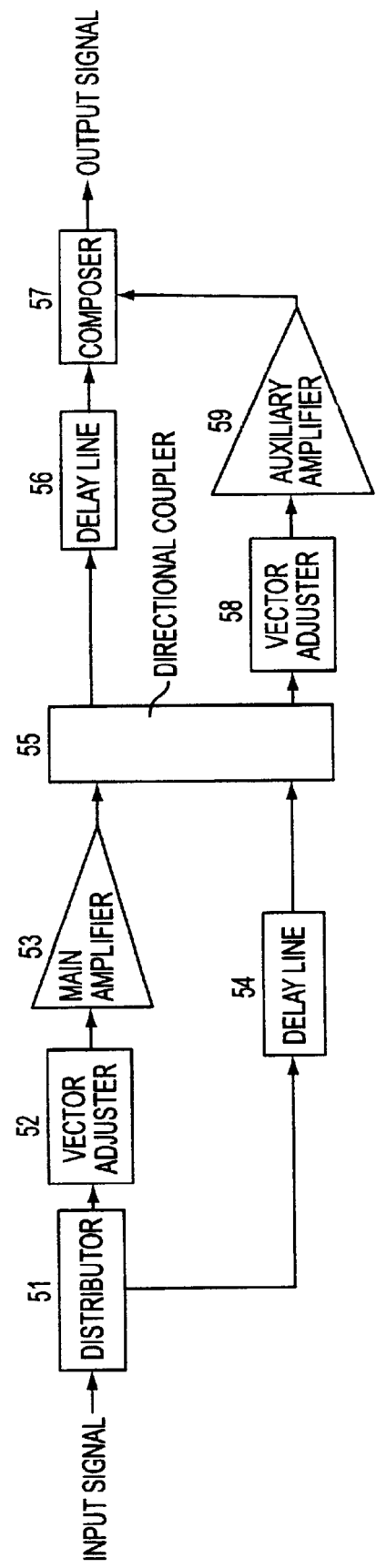
FIG. 5 is an explanatory block diagram of a distortion-compensating amplifier.

FIG. 4 is a block diagram of the main parts of another exemplary embodiment of this invention. 32-1, 32-2, and 32-3 are composers, 33-1, 33-2, and 33-3 are transmission amplifiers, 34-1 through 34-x, 35-1 through 35-y, and 36-1 through 36-z are band elimination filters, 37 is a composition means, and 41, 42, and 43 are the first, second, and third transmission units.

The embodiments shown in FIGS. 1 and 3 illustrate the case in which numbers are assigned continuously to multiple wireless channels arranged within the used wireless frequency band with prescribed frequency intervals. Transmission amplification is done divided into two systems, odd-number and even-number, but this embodiment illustrates the case in which transmission amplification is done divided into three systems, by first, second, and third transmission units 41, 42, and 43. That is, composer 32-1 composes the transmission signals of wireless channels of frequencies f1, f4, f7, . . . of wireless channel numbers CH1, CH4, CH7, . . . ; composer 32-2 composes the transmission signals of wireless channels of frequencies f2, f5, f8, . . . of wireless channel numbers CH2, CH5, CH8, . . . ; and composer 32-3 composes the transmission signals of wireless channels of frequencies f3, f6, f9, . . . of wireless channel numbers CH3, CH6, CH9, . . .

Band elimination filter 34-1, of first transmission unit 41, has frequency characteristics that eliminate frequency f0, which lies outside the used wireless frequency band. Band elimination filter 34-2 has frequency characteristics that eliminate frequencies f2 and f3, and band elimination filter 34-3 has frequency characteristics that eliminate frequencies f5 and f6. Similarly below, in second and third transmission units 42 and 43 the composition of band elimination filters eliminates frequency components that are to be subjected to transmission amplification processing. In this embodiment, for example, band elimination filter 34-2 is constructed so as to eliminate the components of frequency f2 and f3 of wireless channel numbers CH2 and CH3.

Band elimination filter 35-1 of second transmission unit 42 has frequency characteristics that eliminate frequency f0 and f1. Band elimination filter 35-2 has frequency characteristics that eliminate frequency f3 and f4, and band elimination filter 35-3 has frequency characteristics that eliminate frequency f6 and f7. Similarly below, in first and third transmission units 41 and 43 the composition of band elimination filters eliminates frequency components that are to be subjected to transmission amplification processing. Band elimination filter 36-1 of third transmission unit 43 has frequency characteristics that eliminate frequency f0, f1, and f2. Band elimination filter 36-2 has frequency characteristics that eliminate frequency f4 and f5, and band elimination filter 36-3 has frequency characteristics that eliminate frequency f7 and f8. Similarly below, in first and second transmission units 41 and 42 the composition of band elimination filters eliminates frequency components that are to be subjected to transmission amplification processing.

Therefore in the transmission signals of each system, the adjacent-channel leakage power is suppressed. Transmission signals of frequencies f1, f4, f7, . . . amplified in common by transmission amplifier 33-1 of first transmission unit 41, transmission signals of frequencies f2, f5, f8, . . . amplified in common by transmission amplifier 33-2 of second transmission unit 42, and transmission signals of frequencies f3, f6, f9, . . . amplified in common by transmission amplifier 33-3 of third transmission unit 43 are all composed by composition means 37, and transmission signals of frequencies f1, f2, f3, . . . can be transmitted from the antenna, which is not pictured.

Composition means 37 in this embodiment, as in the embodiment shown in FIG. 3, may be made with multiple circulators. That is, because it consists of three systems, it would be made by cascade-connecting four circulators, including a circulator with signal splitting function. If the number of wireless channels arranged within the used wireless frequency band at prescribed frequency intervals is very large, it can be divided into three or more multiple systems. Common amplification can be done corresponding to each system, and multiple band elimination filters can be provided connected in cascades to suppress adjacent-channel leakage power. Each band elimination filter can be made with a superconducting filter that is used as a superconducting state.

As described above, this invention puts multiple wireless channels arranged within the used wireless frequency band at prescribed frequency intervals into systems with gaps of at least one. For example, two systems, of odd-number wireless channel numbers and even-number wireless channel numbers, in which there are gaps of one, or three systems in which there are gaps of two, has transmission amplifiers that amplify in common the transmission signals of each system, and has multiple cascade-connected band elimination filters that suppress the adjacent-channel leakage power. Compared with the individual amplification system of the conventional example, the number of transmission amplifiers and band elimination filters is reduced. Frequency allocations can be made that cannot be realized in the common amplification system, and the equipment can be made so that it is smaller and consumes less power.

What is claimed is:

1. A transmission apparatus for transmitting a plurality of wireless channels allocated within a prescribed frequency band interval, comprising:

a plurality of amplifiers, each amplifier amplifies one group of groups by which said plurality of wireless transmission channels are classified so as not to classify said wireless transmission channels whose frequency bands are next to each other into a same group;

a plurality of filtering units, each filtering unit is allocated for said each amplifier, filters said one group amplified by said amplifier to reduce the frequency component of frequency bands whose wireless channels belong to another group;

a combining unit for combining outputs of said plurality of filtering units; and an antenna for transmitting an output of said combiner.

2. The transmission apparatus according to claim 1, wherein said filtering unit comprising a plurality of filters, each filter reduces the frequency component of each of said frequency bands whose wireless channels belongs to another group.

3. The transmission apparatus according to claim 1, wherein said filtering unit reduces the frequency component of adjacent channel leakage power of said wireless channels of one group generated by said amplifier.

4. A transmission apparatus for transmitting a plurality of wireless channels allocated within a prescribed frequency band interval, comprising:

a first amplifier amplifying a first of two groups into which said plurality of wireless transmission channels are divided so as not to divide said wireless transmission channels whose frequency bands are next to each other into same group;

a second amplifier for a second group of said two groups;

a first filtering unit allocated for said amplifier and filtering the first group amplified by said first amplifier to reduce a frequency component of frequency bands whose wireless channels belongs to the second group;

a second filtering unit allocated for said second amplifier and filtering the second group amplified by said second amplifier to reduce a frequency component of frequency bands whose wireless channels belongs to the first group;

a combination unit for combining an output of said first filtering unit and an output of said second filtering unit; and an antenna for transmitting an output of said combiner.

5. The transmission apparatus according to claim 4, wherein said first filtering unit comprising a plurality of filters, each filter reduces the frequency component of each said frequency bands whose wireless channels belongs to another group.

6. The transmission apparatus according to claim 4, wherein said second filtering unit comprising a plurality of filters, each filter reduces the frequency component of each of said frequency bands whose wireless channels belongs to another group.

7. The transmission apparatus according to claim 4, wherein said first filtering unit reduces the frequency component of adjacent channel leakage power of said wireless channels of the one group generated by said first amplifier.

8. The transmission apparatus according to claim 4, wherein said second filtering unit reduces the frequency component of adjacent channel leakage power of said wireless channels of the second group generated by said second amplifier.

* * * * *